(12) United States Patent
Valdes De La Garza et al.

(10) Patent No.: US 12,344,541 B2
(45) Date of Patent: Jul. 1, 2025

(54) HIGH-PRECISION, HIGH-EFFICIENCY RECIRCULATION SYSTEM FOR PRESERVING MULTIPLE-DENSITY BIOMASS AND ATTACHED BIOFILM IN WASTEWATER TREATMENT BIOREACTORS

(71) Applicants: Xavier Valdés De La Garza, Jalisco (MX); Francisco Xavier Valdés Simancas, Jalisco (MX)

(72) Inventors: Xavier Valdes De La Garza, Guadalajara (MX); Francisco Xavier Valdes Simancas, Guadalajara (MX)

( * ) Notice: Subject to any disclaimer, the term of this patent is extended or adjusted under 35 U.S.C. 154(b) by 380 days.

(21) Appl. No.: 17/778,723

(22) PCT Filed: Nov. 25, 2019

(86) PCT No.: PCT/MX2019/000130
§ 371 (c)(1),
(2) Date: May 20, 2022

(87) PCT Pub. No.: WO2021/101359
PCT Pub. Date: May 27, 2021

(65) Prior Publication Data
US 2023/0020881 A1    Jan. 19, 2023

(30) Foreign Application Priority Data
Nov. 22, 2019   (MX) .................. MX/A/2019/014001

(51) Int. Cl.
*C02F 3/20* (2023.01)
*C02F 3/22* (2023.01)

(52) U.S. Cl.
CPC . *C02F 3/20* (2013.01); *C02F 3/22* (2013.01)

(58) Field of Classification Search
CPC ............ B01F 23/23341; B01F 23/2368; B01F 27/80; C02F 3/20; C02F 3/22; C02F 3/205
(Continued)

(56) References Cited

U.S. PATENT DOCUMENTS 4,066,722 A * 1/1978 Pietruszewski ..... B01F 23/2331
                                                          210/219
6,464,384 B2 * 10/2002 Kubera ............. B01F 23/23421
                                                          366/264
(Continued)

FOREIGN PATENT DOCUMENTS

CA      2985092 A1    5/2018
CN    209276223 U  *  8/2019  ................ C02F 3/28
(Continued)

OTHER PUBLICATIONS

Xu et al, CN 209276223 U, English machine translation, pp. 1-4 (Year: 2019).*

*Primary Examiner* — Claire A Norris
(74) *Attorney, Agent, or Firm* — Feeney IP Law; Alan F Feeney

(57) ABSTRACT

The present invention relates to a high-precision, high-efficiency recirculation system for preserving multiple-density biomass and attached biofilm in wastewater treatment bioreactors, which is characterized in that it consists of a bioreactor tank in which a central recirculation duct is centrally and vertically disposed, said duct comprising a diffuser cone at the bottom thereof, close to the bottom of a baffle of the bioreactor, and an upper guide cone at the upper end thereof, wherein the central recirculation duct is designed for an inductor/nozzle to be inserted there into up to the limit of the upper wall of the bioreactor baffle, said parts forming together a central assembly containing, in vertical attitude, a drive shaft which comprises, at the upper end thereof, above the inductor/nozzle, sealing means for (Continued)

hermetic sealing at the upper wall of the bioreactor baffle, wherein the upper end of the drive shaft is coupled to a low-revolution motor reducer for rotating the drive shaft, which comprises one or more axial-type impellers, and wherein the lower end of the drive shaft is coupled to a hyperbolic impeller/mixer close to the bottom of the bioreactor baffle.

10 Claims, 4 Drawing Sheets

(58) Field of Classification Search
USPC .................................................. 210/194, 197
See application file for complete search history.

(56) References Cited

U.S. PATENT DOCUMENTS

| | | |
|---|---|---|
| 2005/0218074 A1 | 10/2005 | Pollock |
| 2011/0319670 A1* | 12/2011 | Fetsko ................... C07C 37/84 |
| | | 568/744 |
| 2018/0057377 A1 | 3/2018 | Bettle, III et al. |

FOREIGN PATENT DOCUMENTS

| ES | 2739643 A1 | 2/2020 |
|---|---|---|
| WO | WO-0185624 A1 | 11/2001 |
| WO | WO-2016183666 A1 | 11/2016 |
| WO | WO-2017174093 A2 | 10/2017 |
| WO | WO-2019103594 A1 | 5/2019 |

* cited by examiner

HIGH-PRECISION, HIGH-EFFICIENCY RECIRCULATION SYSTEM FOR PRESERVING MULTIPLE-DENSITY BIOMASS AND ATTACHED BIOFILM IN WASTEWATER TREATMENT BIOREACTORS

CROSS-REFERENCE TO RELATED APPLICATIONS

This application is a continuation under 35 U.S.C. § 371 of International Application No. PCT/MX2019/000130 filed on Nov. 25, 2019 that claims priority to Mexican National Application No. MX/a/2019/014001 filed on Nov. 22, 2019, the entire contents of which is incorporated herein by reference.

FIELD OF THE INVENTION

The present invention relates to the field of mechanics and biotechnology in general; in particular, it relates to the systems and methods of wastewater treatment, specifically to the means and devices used in wastewater treatment plants and more specifically to a high-precision, high-efficiency recirculation system for preserving multiple-density biomass and attached biofilm in wastewater treatment bioreactors.

BACKGROUND OF THE INVENTION

It is widely known that the growth of the population and of its requirements at a personal and industrial level means that the increasing demand for water is ubiquitous. Therefore, it is vitally important to properly utilize wastewater in order to release large volumes of clean water for the human supply (Gil Pulido).

Microorganisms play an important role in any wastewater treatment process. In general, liquid waste from different industrial sectors (agribusiness, food, some petrochemicals, etc.) and municipal sewage is treated biologically. These biological processes that occur in most reactors, under specific and controlled conditions, take place naturally in rivers, lakes, and other aquatic systems (Gil Pulido).

Biotechnology can be defined as "any technological application that uses biological systems, living organisms, or derivatives thereof, to make or modify products or processes for specific use" (Convention on Biological Diversity, Article 2. Use of Terms, United Nations. 1992). So given the use of the tool that microorganisms provide us naturally means that biotechnological processes are regarded as an increasingly widespread technology in the management of this type of waste, both economically and ecologically. (Gil Pulido).

In the specific case of wastewater, the techniques developed in biotechnology in this area not only aim to reduce organic matter in general, but rather they are also used to eliminate other industrial pollutants present in the water, as well as to convert the flow of waste derived from the purification process into useful products or even with added value in order to enable them to be released into the environment without causing damage (such as compost from sewage sludge). (Gil Pulido).

At present, the use of aquatic plants, microalgae, and biodegradation processes for the treatment and subsequent reuse of wastewater are some options for improving the quality of treated water and for increasing the efficiency of treatment plants. The following is a brief description of these three options and of what is being done at the water treatment level. (Gil Pulido).

Both aerobic and anaerobic biological processes are widely used in the treatment of wastewater for its remediation.

In biological reactors, the greater the turbulence and velocity of the fluids, the greater the contact factor (and mass transfer), but this not only consumes energy but also promotes the suspension of the biomass and hence the possible washout or migration thereof out of the reactor. On the other hand, at high speeds or in the case of sudden shocks, the biofilm that is attached to biocarriers runs the risk of detaching and washing away at later stages.

When used in anaerobic or anoxic reactors, conventional mixers use single agitators per unit area of the reactor, which, while promoting contact between the biomass and the organic load, do so at great energetic cost in a random manner which results in a system that is completely turbulent and, in general, operates at speeds that are too high to allow harmonious coexistence of different types of biomass and/or biofilms.

The drawbacks of the systems of the prior art include: The higher energy consumption, uncertainty with respect to the trajectory of the different molecules of the influent, and the difficulty of coexistence and retention of the different types of biomass in the reactor.

Our invention, beyond consisting of a single agitator, contains a series of elements which induce an orderly flow of the different influents and recirculation in the bioreactor, allowing for a diversity of biomasses and solving the aforementioned problems.

A search was carried out in order to determine the closest prior art, and the following documents were found:

Document D1 (WO2016183666 A1) by Seyed Nourbakhsh et al. dated May 19, 2015 discloses a water treatment system for monitoring and controlling a concentration of water treatment substances within a reservoir. The water treatment system for a water reservoir comprises: a water treatment device that is in fluid communication with a recirculating flow path from the reservoir, the operative water treatment device for administering one or more treatment materials to the water flowing through the recirculation flow path, measuring a flow rate through the recirculation flow path, and measuring the amount of treatment materials administered; the more operative water treatment device for reporting the measured flow rate and the amount of treatment materials administered to a chemical model; the operative chemical model for receiving a reservoir volume as input, receiving the reported measured flow rate and amount of treatment materials administered, and calculating the current reservoir water treatment status on the basis of the received inputs.

The water treatment device 300 comprises an inlet end cap 210 which enables a flow path to be provided for the ingress of fluid for water treatment. The device 300, which forms part of treatment housing 205, contains and conceals all of the other internal parts and provides a waterproof enclosure for housing the electronic control system. The inlet end cap 210. An outer cover 205 forms a part of the treatment casing that contains and conceals all of the other internal parts. An outer cover 205 can be constructed from a single layer of plastic or other suitable material for containment or from one or more layers in order to perform other functions. For example, an internal conductive layer such as stainless steel that is electrically connected to an electronic control system can participate in the electrolytic treatment process by providing an opposing cathodic surface for an external electrode of an electrolytic treatment system 330, thereby improving the performance of an electrolytic system. A treatment system providing an additional electrode when required. A second outer layer in this example can be a non-conductive layer of plastic or other material that prevents electrical leakage to the environment or electrical hazards to users. In one aspect, the second outer layer can be a transparent layer that enables the user to visually see the inner metallic conductive layer. An electrolytic treatment system 330 has a number of parts that combine to enable the electrolytic treatment system 330 to efficiently produce substances that are useful for treatment purposes when electrical power is supplied thereto. The electrolytic treatment system 330 includes at least one electrolytic cell that is composed of at least two electrodes and is capable of producing at least one substance that is useful for treating water through a single electrochemical process, for example, for producing copper ions and silver through the copper and silver ionization process.

The arrangement, layout, and components of the water treatment system for monitoring and controlling a concentration of water treatment substances within a reservoir of document D1 differs completely from our invention: In D1, the system is based on electrolytic treatment components and systems and comprises means for monitoring and controlling a concentration of water treatment substances to be supplied to a reservoir. Document D1 neither discloses nor suggests a high-precision, high-efficiency recirculation system for preserving multi-density biomass and attached biofilm that would enable a predetermined recirculation of the liquid and solid contents of a bioreactor to be achieved in a manner that maximizes the contact factor between the organic load and the different types of biomass and hence the mass transfer capacity, and in which shortcuts that the influent could take in the reactor are eliminated, while minimizing a) the washing-out (or exiting from the reactor) of suspended and granular biomass, b) the detachment of biomass attached to film-type biocarriers, and c) the energy consumed in order to achieve this.

Document D2 (US20050218074A1) by David C. Pollock, dated Apr. 6, 2004 was also found, which discloses a submerged membrane assembly which comprises a membrane having a first surface, a second surface, and a vertical axis and which is permeable between the surfaces for molecules of less than a predetermined size. A first fluid compartment which is in fluid communication with the first membrane surface and, at a first column height, contains a first fluid having a first specific gravity, a second fluid compartment which is in fluid communication with the second membrane surface and, at a second column height, contains a second fluid having a second specific gravity, and means for changing the second specific gravity. The height of the second column is selected relative to the height of the first column to produce a selected pressure differential across the membrane along the vertical axis at the first specific gravity and the modified second specific gravity.

Said document D2 discloses an improved bioreactor for wastewater treatment in which the bioreactor receives a wastewater influent containing biodegradable matter for treatment and produces an effluent stream having a first specific gravity, the improvement comprising: a compartment for main tank fluid that receives and contains the effluent stream, a submerged membrane assembly being removably mounted; a separate second fluid compartment containing a second fluid having a second specific gravity; the submerged membrane assembly comprising: a permeable membrane having a first surface, a second surface, and a vertical axis and being permeable between the first and second surfaces for molecules of less than a predetermined size; the first membrane surface is in fluid communication with the effluent stream; and the second membrane surface is in fluid communication with the second fluid; means for imposing a differential hydraulic head between the effluent contained in the tank and the second fluid contained in the fluid compartment; and means for changing the second specific gravity; as well as a fluid collector that collects the second fluid.

As can be seen, document D2 neither discloses nor suggests a high-precision, high-efficiency recirculation system for preserving multiple-density biomass and attached biofilm that makes it possible to achieve a predetermined recirculation of the liquid and solid contents of a bioreactor in a way that maximizes the contact factor between the organic load and the different types of biomass and hence the mass transfer capacity.

Document D2 neither discloses nor suggests a high-precision, high-efficiency recirculation system for preserving multi-density biomass and attached biofilm that would enable a predetermined recirculation of the liquid and solid contents of a bioreactor to be achieved in a way that maximizes the contact factor between the organic load and the different types of biomass and hence the mass transfer capacity, and in which shortcuts that the influent could take in the reactor are eliminated, while minimizing a) the washing-out (or exiting from the reactor) of suspended and granular biomass, b) the detachment of biomass attached to film-type biocarriers, and c) the energy consumed in order to achieve this.

Another document that was found is document D3 (CA2985092A1) by Bettle Griscom et al. of Nov. 9, 2017, which discloses a method for removing carbon, nitrogen, and phosphorus from a liquid, comprising: a. causing the liquid to enter a first cell of a lagoon, wherein the first cell comprises at least one circulator that forms a cavitation zone, forming a plurality of granules; b. flowing liquid from the first cell to a second cell of the lagoon, wherein the second cell comprises an array of at least two circulators that are arranged in a substantially straight line that is substantially perpendicular to the net flow; and c. flowing liquid from the second cell to a third cell of the lagoon, wherein the third cell comprises at least one circulator that forms a perimeter flow in at least a portion of the third cell, the perimeter flow causing a reduction in various live microalgae in the third pool.

It also discloses a lagoon which comprises a plurality of layers comprising: a first aerobic layer comprising microalgae; a second bubble cavitation layer that is vertically deeper than the first layer; a third, optional layer of optional hydrolysis and formation of anaerobic gas that is vertically deeper than the second layer; and a fourth, anaerobic layer that is vertically deeper than the third, optional layer.

However, document D3 neither discloses nor suggests a high-precision, high-efficiency recirculation system for preserving multiple-density biomass and attached biofilm that makes it possible to achieve a predetermined recirculation of the liquid and solid contents of a bioreactor in a manner which maximizes the contact factor between the organic load and the different types of biomass and hence the mass transfer capacity, and in which shortcuts that the influent could take in the reactor are eliminated, while minimizing a) the washing-out (or exiting from the reactor) of suspended and granular biomass, b) the detachment of biomass attached to film-type biocarriers, and c) the energy consumed in order to achieve this.

Document D4 (WO2017174093 A9) from Uller Bjarne et al. of Apr. 6, 2017 discloses methods and reactors for microbial digestion and/or reaction and, specifically, methods and reactors which comprise an insert comprising a biofilm that is immobilized in a carrier matrix. The invention also relates to methods and reactors for anaerobic digestion and, specifically, to methods and reactors in which a methane-producing biofilm is immobilized on a carrier matrix having a fixed orientation.

Document D4 discloses an outer tubular structure (A1) having a longitudinal extension (L) made of a fluid, non-penetrable material and having an opening (A2, A3) at each end of the outer tubular structure so as to define an open compartment forming a flow passage within the outer tubular structure extending between said openings, and one or more fluid-penetrating biofilm carriers (A4) disposed within said outer tubular structure (A1), so that when the insert is disposed in a tank reactor and said tank reactor is in operation, the direction of flow of the fluid plug within the insert is in the longitudinal direction of the insert.

In that fixed-film, fixed-bed bioreactor system, the immobilization matrix is characterized in that it comprises a plurality of vertically oriented porous tubular carriers that support biofilms, with mixing zones being provided both above the top openings and below the lower openings of the tubular carriers, and with the anaerobic digestion of the raw material being carried out in such a way as to maintain a substantially laminar flow through the tubular carriers as well as mixing within each of the mixing zones. The anaerobic digestion bioreactor comprises a cylindrical tank having a plurality of internal vertical biofilm carrier compartments that are defined by baffles or walls made of corrosion-impermeable and liquid-impermeable material and open at the top, with each carrier compartment comprising a shortened wall or bottom flow opening on one side at the bottom which serves as an opening into another carrier compartment, whereby fluid flows can be directed through successive compartments, and with a plurality of the carrier compartments further comprising a foreshortened wall or overflow opening at the top on a side other than the side containing a foreshortened wall or underflow opening at the bottom which serves as an opening to another carrier compartment, so that fluid flows can be conducted through successive compartments, which optionally further comprise a rotating scraper that is adapted so as to define sealed sections in a settling zone located below the lowest edge of the carrier compartments when in a closed position or so as to allow for removal of settled solids when in an open position.

As can be seen, document D4 neither discloses nor suggests a high-precision, high-efficiency recirculation system for preserving multi-density biomass and attached biofilm in wastewater treatment bioreactors that makes it possible to achieve a predetermined recirculation of liquid and solid contents of a bioreactor in a way in which the contact factor between the organic load and the different types of biomass, and hence the mass transfer capacity, is maximized, and in which the shortcuts that the influent could take in the reactor are eliminated, while enabling i) the washing-out (or exiting from the reactor) of suspended and granular biomass, ii) the detachment of biomass attached to film-type biocarriers, and iii) the energy consumed in order to achieve this to be minimized.

The present invention was developed in response to the need for a high-precision, high-efficiency recirculation system for preserving multi-density biomass and attached biofilm in wastewater treatment bioreactors that resolves the deficiencies and drawbacks offered by other technologies.

OBJECT OF THE INVENTION

It is the primary objective of the present invention to provide a high-precision, high-efficiency recirculation system for preserving multiple-density biomass and attached biofilm that makes it possible to achieve a predetermined recirculation of the liquid and solid contents of a bioreactor in a way in which the contact factor between the organic load and the different types of biomass, and hence the mass transfer capacity, is maximized; shortcuts that the influent could take in the reactor are eliminated, while minimizing a) the washing-out (or exiting from the reactor) of suspended and granular biomass, b) the detachment of biomass attached to film-type biocarriers, and c) the energy consumed in order to achieve this.

It is another object of the invention to provide said recirculation system, which comprises a plurality of elements that make it possible to induce an orderly flow of the different influents and recirculations of a bioreactor while allowing a diversity of biomasses.

It is another object of the invention to provide said recirculation system, which also completely eliminates the possibility of an influent entering a reactor taking a short path to the outlet and not having sufficient exposure to the bacterial colonies that are necessary for digestion thereof.

It is another object of the invention to provide said recirculation system, which also allows for precise control of speeds and accelerations in order, on the one hand, to overcome the buoyancy of the biocarriers and not detach the biofilm that is adhered thereto by driving them to the bottom through the discharge and mixing duct and, on the other hand, to sufficiently raise the blanket of sludge from the bottom of the reactor (both granular and suspended biomass) so that it has profuse contact with the contaminants, but without expelling the same from the reactor.

It is another object of the invention to provide said recirculation system, which also manages to perform the mixing function using a fraction of the energy consumed by conventional mixers and with better contact factors between the different types of biomass and the pollutants, increasing the rates of removal of the bioreactor and reducing its operating cost and carbon footprint.

It is another object of the invention to provide said high-precision, high-efficiency recirculation system for preserving multiple-density biomass and attached biofilm that can be implemented in reactors of an anaerobic, aerobic, and anoxic nature.

And all of these features and objects will become apparent from a general and detailed description of the present invention with reference to the illustrated embodiments.

BRIEF DESCRIPTION OF THE INVENTION

In general, the high-precision, high-efficiency recirculation system for preserving multiple-density biomass and attached biofilm in bioreactors for wastewater treatment consists of a bioreactor tank in which is disposed a central recirculation duct which comprises at its lower end a diffuser cone that is close to the bottom of the bioreactor baffle and, at its upper end, an upper guide cone that is configured to receive an inductor/nozzle in its interior up to the limit of the upper wall of the baffle of the bioreactor, producing overall a central assembly that internally houses in vertical attitude a drive shaft which includes, at its upper end above the inducer/nozzle, a male/female gasket assembly, and whose upper end is coupled to a low-speed gearmotor having a protective cover for rotating said drive shaft, which is aligned, shaped, and centered by at least one or more central supports and may have ceramic bushings; along said drive shaft, at least one or a plurality of axial-type impellers are mounted and a hyperbolic mixer/impeller is attached to its lower end, which remains close to the bottom of the bioreactor baffle.

Said baffle of the bioreactor comprises at the top an influent duct to the bioreactor; at the top, it comprises a recirculation inlet duct, and there is an outlet duct of the bioreactor on the side opposing the wall of the bioreactor where said influent inlet duct is arranged.

The inducer/nozzle projects the recirculation water from other stages to the center of the upper guide cone and to the central recirculation duct coming from the recirculation inlet duct. The inductor/nozzle arrangement, upper guide cone, and the central recirculation duct work as if they were a nozzle/Venturi system to induce the flows of other stages as well as internal and external recirculations down the bioreactor through the interior of the central recirculation duct.

In the case of at least one or a plurality of impellers of the axial type, they are used to displace the water longitudinally with respect to the drive shaft through the central recirculation duct, with the number of impellers depending on the depth of the reactor. The reason why a plurality thereof are used is that the maximum accelerations and speeds that can be achieved in each one have to be enough to push the water and the biocarriers to the bottom of the bioreactor, since these are less dense than water, but at a slower rate than where detachment of the biofilm from the carrier would occur. Similarly, the lower diffuser cone is provided in the terminal part of the central recirculation duct, and a hyperbolic mixer/impeller, whose purpose is to change the direction of the flow from vertically descending to radial and subsequently ascending at a lower speed within the bioreactor, is mounted on the drive shaft and rotates therewith.

This configuration makes it possible to achieve the goal of high efficiency, not only in mass transfer and contaminant removal, but also in energy use and the preservation of multiple types of biomass, which was achieved through a meticulous and innovative hydraulic design consisting of a plurality of types of inductors, impellers, and diffusers for directing the flow to where it is required from the bioreactor while providing the speeds for preserving the different types of biomass/biofilm therein.

In one of the embodiments of the invention, the system comprises a Venturi-nozzle pumping system that allows the flow to be drawn down through the central recirculation duct.

In order to better understand the features of the invention, the present description is accompanied by the drawings described below, which form an integral part thereof and are of an illustrative but non-limiting nature.

Figure 1:
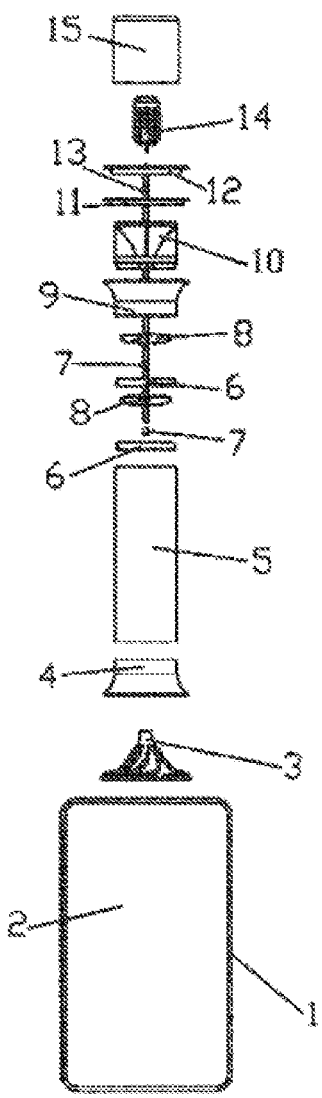
FIG. 1 is an exploded front view of the high-precision, high-efficiency recirculation system for preserving multi-density biomass and attached biofilm in wastewater treatment bioreactors.

In order to facilitate understanding of the invention, a detailed description will be provided below of some of the embodiments thereof as depicted in the drawings, which are appended to the present invention for illustrative but non-limiting purposes.

DETAILED DESCRIPTION OF THE INVENTION

The characteristic details of the high-precision, high-efficiency recirculation system for preserving multi-density biomass and attached biofilm in wastewater treatment bioreactors are clearly elucidated in the following description and in the accompanying illustrative drawings, with the same reference signs serving to denote same parts.

Figure 2:
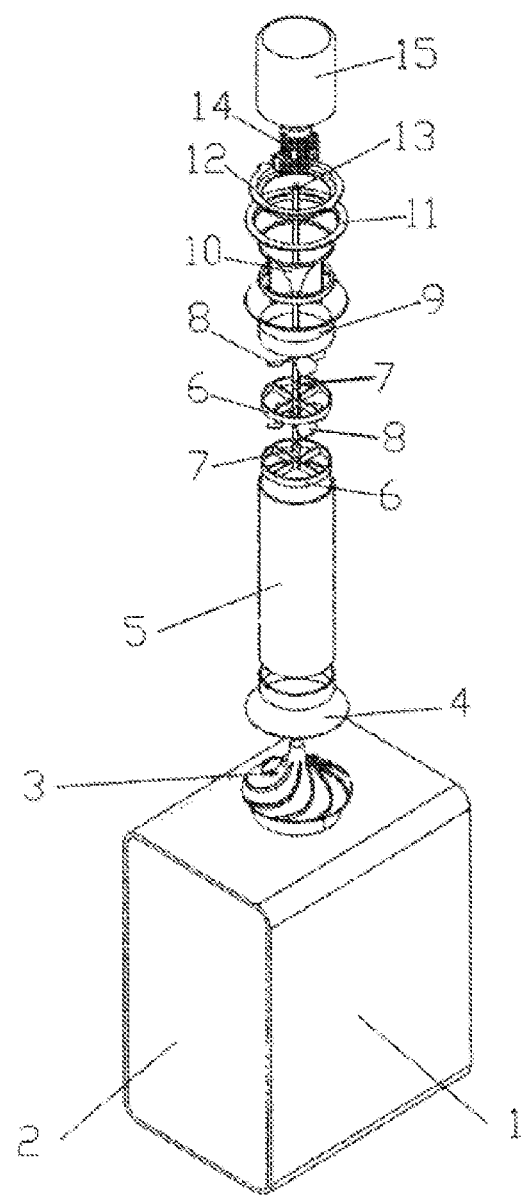
FIG. 2 illustrates a conventional exploded perspective view of the high-precision, high-efficiency recirculation system for preserving multiple-density biomass and attached biofilm in wastewater treatment bioreactors.
Figure 3:
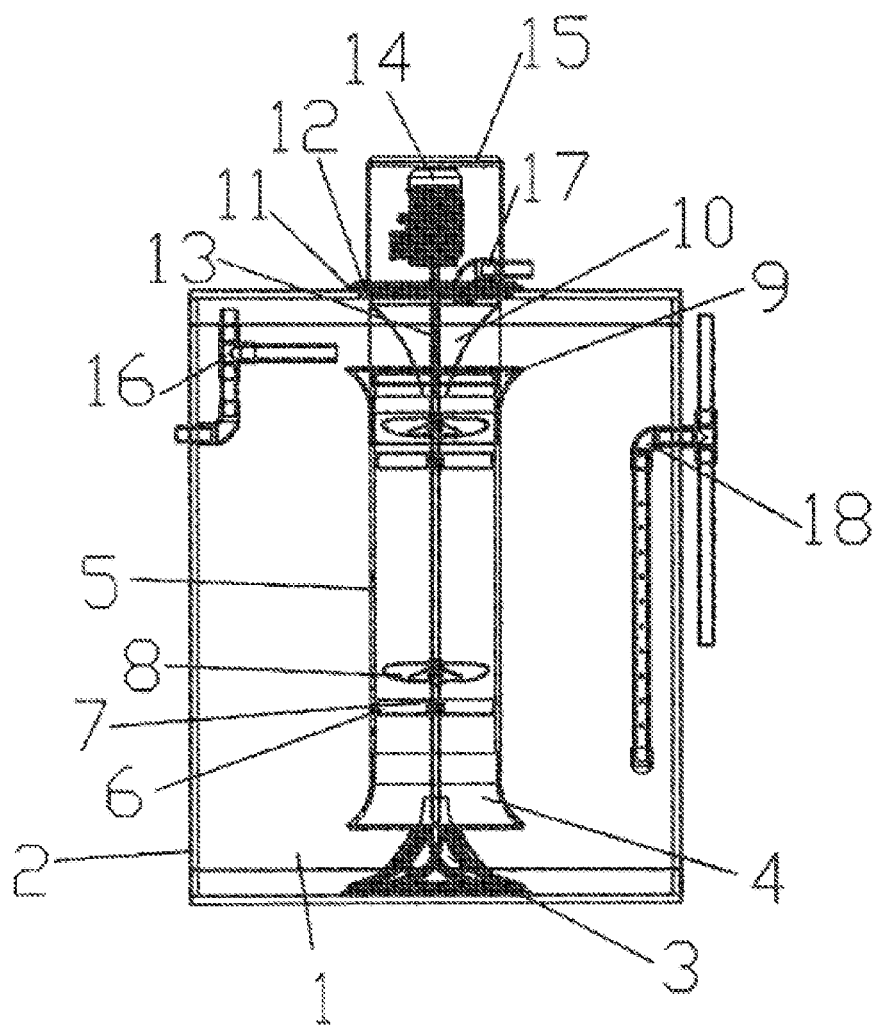
FIG. 3 shows a cross section on the vertical axis of the high-precision, high-efficiency recirculation system for preserving multi-density biomass and attached biofilm in wastewater treatment bioreactors.
Figure 4:
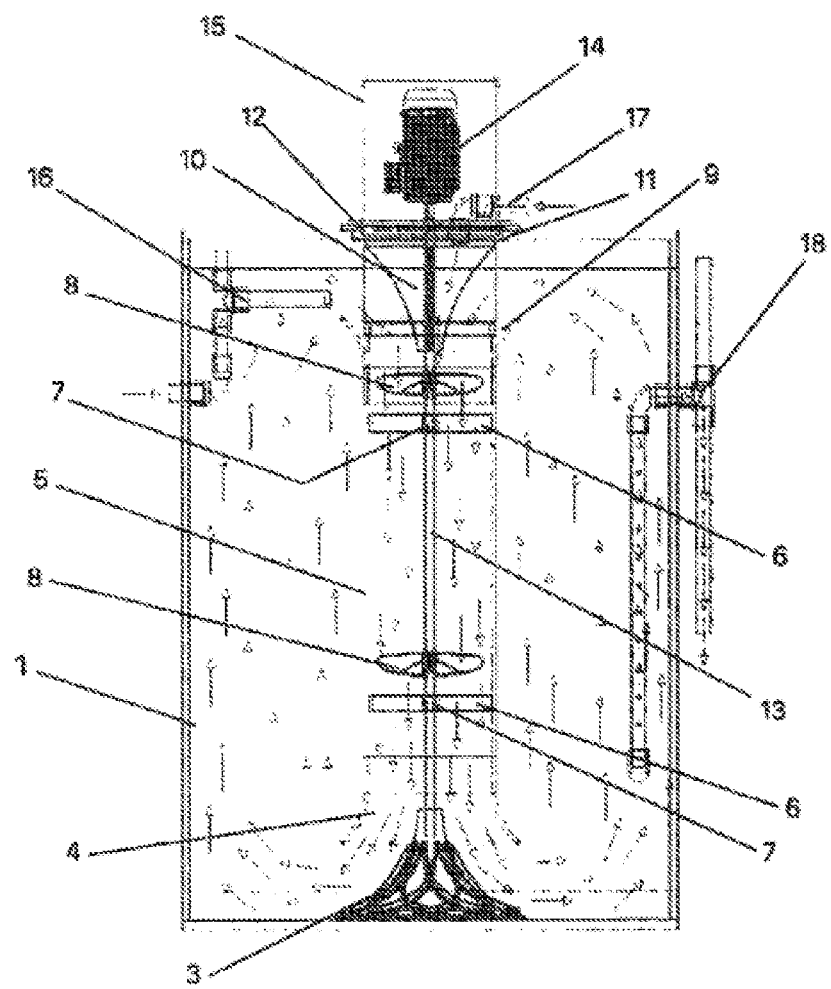
FIG. 4 shows a cross section on the vertical axis of the high-precision, high-efficiency recirculation system for preserving multi-density biomass and attached biofilm in wastewater treatment bioreactors showing the arrows for the influent, recirculation, and outlet flows.

With reference to FIGS. 1 to 4, the high-precision, high-efficiency recirculation system for preserving multiple-density biomass and attached biofilm in bioreactors for wastewater treatment consists of a bioreactor tank (1) in which is disposed a central recirculation duct (5) which comprises at its lower end a lower diffuser cone (4) that is close to the bottom of the baffle (2) of the bioreactor (1) and, at its upper end, an upper guide cone (9) that is configured to receive an inductor/nozzle (10) in its interior up to the limit of the upper wall of the baffle (2) of the bioreactor (1), producing overall a central assembly that internally houses in vertical attitude a drive shaft (13) which includes, at its upper end above the inducer/nozzle (10), a male/female gasket assembly (12), and whose upper end is coupled to a low-speed gearmotor (14) having a protective cover (15) for rotating said drive shaft (13), which is aligned, shaped, and centered by at least one or more central supports (6) and may have ceramic bushings (7).

At least one or a plurality of axial-type impellers (8) are mounted along said drive shaft (13), and a hyperbolic mixer/impulsor (3) is fixed to the lower end thereof, which remains close to the bottom of the baffle (2) of the bioreactor (1).

Said baffle (2) of the bioreactor (1) comprises at the top an influent duct (16) to the bioreactor (1); at the top, it comprises a recirculation inlet duct (17), and there is a bioreactor outlet duct (18) on the side opposing the wall of the bioreactor (1) where said influent inlet duct (16) is located.

The inducer/nozzle (10) projects the recirculation water from other stages to the center of the upper guide cone (9) and to the central recirculation duct (5) coming from the recirculation inlet duct (17). The inductor/nozzle arrangement (10), upper guide cone (9), and the central recirculation duct (5) function as if they were a nozzle/Venturi system to induce the flows of other stages and internal and external recirculation down the bioreactor (1) through the inner part of the central recirculation duct (5).

The at least one or a plurality of axial-type impellers (8) are used to displace the water longitudinally with respect to the drive shaft (13) through the central recirculation duct (5), with the number of impellers depending on the depth of the reactor. The reason why a plurality thereof are used is that the maximum accelerations and speeds that can be achieved in each one have to be enough to push the water and the biocarriers to the bottom of the bioreactor (1), since these are less dense than water, but at a slower rate than where detachment of the biofilm from the carrier would occur. Similarly, the lower diffuser cone (4) is provided in the terminal part of the central recirculation duct (5), and a hyperbolic mixer/impeller (3), whose purpose is to change the direction of the flow from vertically descending to radial and subsequently ascending at a lower speed within the bioreactor (1), is mounted on the drive shaft (13) and rotates therewith.

This configuration makes it possible to achieve the goal of high efficiency, not only in mass transfer and contaminant removal, but also in energy use and the preservation of multiple types of biomass through a meticulous and innovative hydraulic design consisting of a plurality of types of inductors, impellers, and diffusers for directing the flow to where it is required from the bioreactor (1) while providing the speeds for preserving the different types of biomass/biofilm therein.

The invention has been described sufficiently so as to enable a person of ordinary skill in the art to reproduce and obtain the results mentioned in the present invention. Despite the fact that any person skilled in the field of the art that is concerned with the present invention may be able to make modifications that are not described in the present application, if the subject matter claimed in the following claims is required for the application of these modifications in a certain structure or in the manufacturing process of thereof, said structures must be included within the scope of the invention.

What is claimed is:

1. A high-precision, high-efficiency recirculation system for preserving multi-density biomass and attached biofilm in wastewater treatment bioreactors, comprising:
   a bioreactor tank:
   a central recirculation duct having a top and a bottom section centrally and vertically disposed in said bioreactor tank, wherein said recirculation duct comprises:
   a diffuser cone;
   baffle having an upper and lower portion, wherein said diffuser cone is located at the bottom of the central recirculation duct close to the lower portion of the baffle;
   an upper guide cone having an interior situated at the upper portion of the baffle;
   an inductor/nozzle inserted into the interior of the upper guide cone and up to the limit of the upper portion of the baffle;
   wherein said diffuser cone, baffle, upper guide cone and inductor/nozzle form a central assembly, comprising
   a vertically-orientated drive shaft having an upper and a lower end,
   a male/female gasket assembly for hermetic sealing at the upper portion of the baffle situated at the upper end of the vertically-orientated drive shaft and above the inductor/nozzle,
   a low-speed gearmotor coupled to the upper end of the vertically-orientated drive shaft, wherein the gearmotor rotates the drive shaft;
   one or more axial-type impellers mounted along the vertically-orientated drive shaft; and
   a hyperbolic impeller/mixer positioned close to the bottom of the baffle and coupled to the lower end of the vertically-orientated drive shaft.

2. The high-precision, high-efficiency recirculation system for preserving multi-density biomass and attached biofilm in wastewater treatment bioreactors as set forth in claim 1, wherein said bioreactor further comprises an upper influent duct that discharges into an area close to the area in which the upper guide cone and said inductor/nozzle are located at the upper end of said central recirculation duct, wherein said recirculation duct comprises a recirculation inlet duct coming from other stages that is connected near the center of the upper portion of the baffle in order to discharge into the upper area of said inductor/nozzle, and a bioreactor outlet duct that is connected to the baffle, wherein said bioreactor outlet duct comprises a section that extends to the end of an area near the bottom of the bioreactor.

3. The high-precision, high-efficiency recirculation system for preserving multi-density biomass and attached biofilm in wastewater treatment bioreactors as set forth in claim 1, wherein said inductor/nozzle is configured to receive recirculating water from the recirculation inlet duct, and to force pressurized recirculation water toward the center of the upper guide cone and the central recirculation duct.

4. The high-precision, high-efficiency recirculation system for preserving multi-density biomass and attached biofilm in wastewater treatment bioreactors as set forth in claim 1, wherein the inductor/nozzle arrangement, the upper guide cone, and the central recirculation duct are configured to induce water flows from other stages and internal and external recirculation toward the bottom area of the bioreactor, wherein said mixer/hyperbolic impeller is arranged to change the direction of the flow from vertically descending to a radial direction and later to an ascending direction at a lower speed inside the bioreactor.

5. The high-precision, high-efficiency recirculation system for preserving multi-density biomass and attached biofilm in wastewater treatment bioreactors as set forth in claim 1, wherein said one or more axial-type impellers mounted along the vertically-orientated drive shaft are configured to displace the water longitudinally downward with respect to the drive shaft through the central recirculation duct, the number of axial impellers being a function of the depth of the reactor.

6. The high-precision, high-efficiency recirculation system for preserving multi-density biomass and attached biofilm in wastewater treatment bioreactors as set forth in claim 1, wherein said low-speed gearmotor comprises a protective cover.

7. The high-precision, high-efficiency recirculation system for preserving multi-density biomass and attached biofilm in wastewater treatment bioreactors as set forth in claim 1, wherein said drive shaft comprises at least one or more central supports and, alternatively, ceramic bushings, for alignment and centering.

8. The high-precision, high-efficiency recirculation system for preserving multi-density biomass and attached biofilm in wastewater treatment bioreactors as set forth in claim 1, further comprising a Venturi-nozzle pumping system that allows the flow to be dragged downward through the central recirculation duct.

9. The high-precision, high-efficiency recirculation system for preserving multi-density biomass and attached biofilm in wastewater treatment bioreactors as set forth in claim 2, wherein said inductor/nozzle is configured to receive the recirculating water from other stages coming from the recirculation inlet duct, and to force pressurized recirculation water toward the center of the upper guide cone and the central recirculation duct.

10. The high-precision, high-efficiency recirculation system for preserving multi-density biomass and attached biofilm in wastewater treatment bioreactors as set forth in claim 2, wherein the assembly and inductor/nozzle arrangement, upper guide cone, and the central recirculation duct are configured to force pressurized water from other stages and internal and external recirculation toward the bottom area of the bioreactor, wherein said mixer/hyperbolic impeller is arranged to change the direction of the flow from vertically descending to a radial direction and later to an ascending direction at a lower speed inside the bioreactor.

\* \* \* \* \*